United States Patent [19]

Beck, Jr.

[11] 4,031,444
[45] June 21, 1977

[54] SOLAR COLLECTOR CONTROL SYSTEM
[75] Inventor: Earl J. Beck, Jr., Ventura, Calif.
[73] Assignee: The United States of America as represented by the Secretary of the Navy, Washington, D.C.
[22] Filed: Oct. 20, 1975
[21] Appl. No.: 624,148
[52] U.S. Cl. .............................. 318/562; 318/625; 318/685
[51] Int. Cl.² ........................................ G05B 11/32
[58] Field of Search ................... 318/562, 625, 685
[56] References Cited
UNITED STATES PATENTS

| 3,719,878 | 3/1973 | Ferguson et al. | 318/562 X |
| 3,781,627 | 12/1973 | Binnig et al. | 318/562 |
| 3,944,903 | 3/1976 | Clegg | 318/562 X |

Primary Examiner—Gene Z. Rubinson
Attorney, Agent, or Firm—Richard S. Sciascia; Joseph S. St.Amand; William W. Cochran, II

[57] ABSTRACT

A system for controlling the movement in azimuth and elevation of a large number of sun following solar energy collectors from a single central controller. The system utilizes servo signal generators, a modulator and a demodulator for transmitting the servo signals, and stepping motors for controlling remotely located solar collectors. The system allows precise tracking of the sun by a series of solar collectors without the necessity or expense of individualized solar trackers.

7 Claims, 2 Drawing Figures

SOLAR COLLECTOR CONTROL SYSTEM

BACKGROUND OF THE INVENTION

The present invention pertains generally to control systems and more specifically to a solar collector control system. One of the expensive items needed to train a solar energy collector, whether it is the flat plate type or the focusing type, is the following device which accurately aims the collector at the sun as it traverses the sky. While current technology provides for such devices, they are expensive and difficult to maintain. Consequently, stationary collectors have been used instead because of their simplicity. However, stationary collectors are generally much less efficient than the sun following collectors and cannot produce the high temperatures required to keep such systems cost effective. For example, the two primary systems for air conditioning using solar energy require heat at a fairly high temperature, that is, usually higher than that conveniently or economically available from fixed flat plate collectors. Furthermore, fixed flat plate collectors tend to be inefficient at high heat collection temperatures as a result of the large area and attendant high heat losses. Considering the advantages and disadvantages of solar heating with respect to fixed plate collectors and sun followers, the high temperature collection of sun follower collectors has a number of real benefits such as decreased heating storage requirements, lighter equipment, less likelihood of leakage into living spaces, smaller heat transfer devices in buildings, smaller fans and motors with resulting smaller pumps, and less insulation.

SUMMARY OF THE INVENTION

The present invention overcomes the disadvantages and limitations of the prior art by providing an improved solar collector control system. The solar collector control system of the present invention provides an inexpensive method of tracking the sun with a solar collector in a very precise manner. A central controller which is capable of tracking the sun very precisely is used to generate elevation and azimuth servo signals indicative of the tracker's position in space. These signals are used to control a large number of remotely located collectors equipped with azimuth and elevation stepping motors responsive to the central controller signals. In this manner, the expense of a solar tracker previously required for each solar collector is divided between a large number of collectors to reduce the cost of each collector.

It is therefore an object of the present invention to provide an improved solar collector control system.

It is also an object of the present invention to provide a solar collector control system for tracking the sun which is inexpensive to operate.

Another object of the present invention is to provide a solar collector control system for controlling a large number of remotely located collectors over a wide geographic area.

Other objects and further scope of applicability of the present invention will become apparent from the detailed description given hereinafter. The detailed description, indicating the preferred embodiment of the invention, is given only by way of illustration since various changes and modifications within the spirit and scope of the invention will become apparent to those skilled in the art from this detailed description. The foregoing abstract of the disclosure is for the purpose of providing a non-legal brief statement to serve as a searching, scanning tool for scientists, engineers and researchers, and is not intended to limit the scope of the invention as disclosed herein nor is it intended to be used in interpreting or in any way limiting the scope or fair meaning of the appended claims.

DETAILED DESCRIPTION OF THE PREFERRED EMBODIMENT

Figure 1:
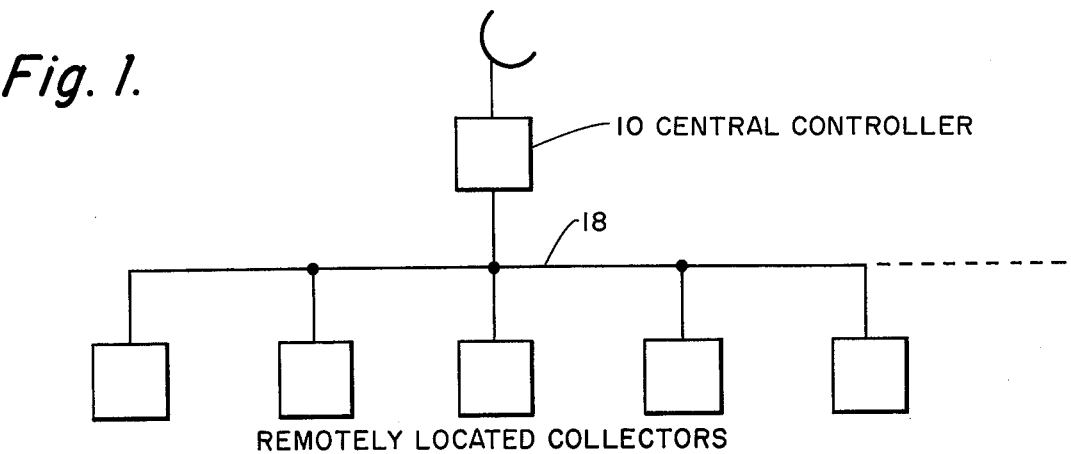
FIG. 1 is a schematic diagram of the overall system of the preferred embodiment of the invention.

FIG. 1 illustrates the overall system of the preferred embodiment of the invention wherein a central controller 10 operates a multiplicity of remotely located collectors. These remotely located collectors can be served by the central controller over a wide geographic area since only small changes in tracking angle over a large area are present. At the time of installation, each of the collectors is centered on the sun. In this manner, slight variations in geographic location are accounted for.

Figure 2:
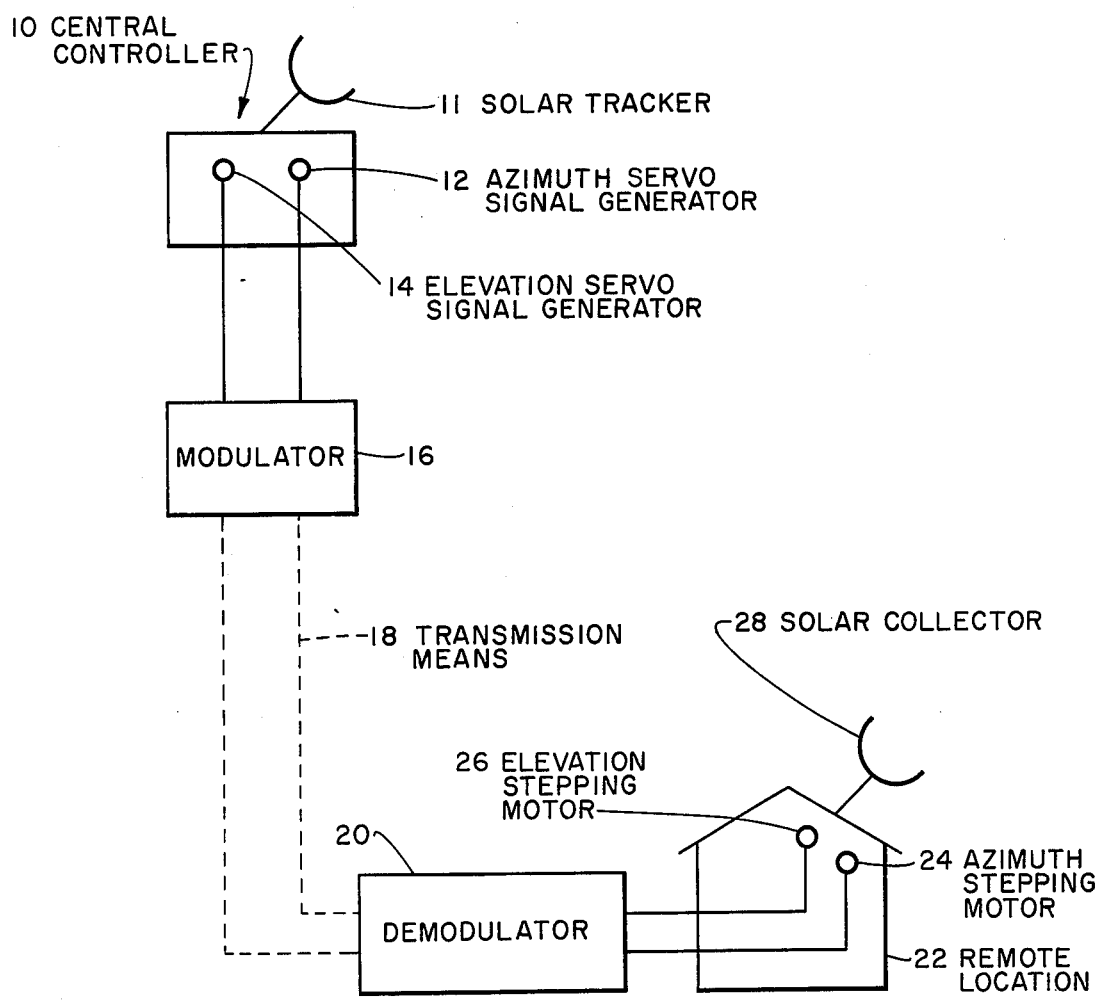
FIG. 2 is a schematic diagram of a single channel of the preferred embodiment of the invention.

FIG. 2 is a block diagram of the system of the preferred embodiment of the invention. The central controller 10 utilizes a well-known solar tracker device 11 for tracking the sun across the sky in a very precise manner. The central controller, as shown in FIG. 2, is centrally located in an area such as a mountain top where the air is clear and where the sun in known to shine a large percentage of the year. Connected to the moving mechanism of the solar tracker is an azimuth servo signal generator 12 and an elevation servo signal generator 14. These generators are driven by the movement of the solar tracker 11 and produce intermittent stepping signals representative of changes in azimuth and elevation. In operation, they produce stepping signals which are modulated by modulator 16 and transmitted via the transmission means 18 to a series of demodulators 20 located at each of the remotely located collectors. These signals can be transmitted to the demodulators 20 by any number of devices including special wires, telephone wires, close circuit T.V. cables, power lines or RF transmitting circuits, etc.

The demodulator 20 functions to demodulate the transmitted signal so that stepping signals, such as those produced by the azimuth servo signal generator 12 and elevation servo signal generator 14, are transmitted to the elevation stepping motor 26 and azimuth stepping motor 24. Each of these stepping motors intermittently indexes the solar collector 28 to the proper position for receiving the sun's radiation. Highly accurate positioning can be obtained through the use of these stepping motors for maximum efficiency of the solar collector 28. The solar collector 28 can be positioned on the roof top or any other convenient location, such as on houses, public buildings, factories or wherever the solar energy is needed by using RF transmission means and a radio receiver demodulator. In addition, the solar collectors can be used in a portable manner in the field to supply power wherever it is needed.

As previously mentioned, the solar collector 28 can be positioned directly toward the sun by observing maximum power output and will thereafter follow the sun in a very precise manner in response to the elevation stepping motor 26 and azimuth stepping motor 24. The collectors, as such, are always pointed toward the sun and in the event of intermittent sunshine such as from clouds, the solar collectors 28 will always function when sunlight is available, thereby avoiding one of the complicated features of individaul servos at the site of collection. The central controller 10, through the use of various control devices such as prerecorded tracking tapes or computerized control tracking, can avoid the problems of intermittent sunshine in a manner which is not commercially feasible by individual units located at the remote locations. The system therefore provides a method of very precisely controlling a large number of solar collectors over a major area such as a block of several hundred square miles in an inexpensive and simplified manner.

Obviously, many modifications and variations of the present invention are possible in light of the above teachings. For example, a number of slave control systems might be employed rather than an entire control system to cover many geographical areas. In the case of Southern California, the use of a control system on Mount Wilson seems obvious. Rather than establish similar systems in the areas of similar latitude or longitude, it appears to be practical to have simpler, semi-automated systems under control of the central system. The relative movement of the earth with respect to the sun is so well known that an ultimate system might consist of a network of slave stations driven from one station in the country, such as the Naval Observatory in Washington or some other favorable control point, which is capable of calculating and transmitting the proper time and motion corrections for each specific geographic area. It is therefore to be understood that within the scope of the appended claims the invention may be practiced otherwise than as specifically described.

What is claimed is:
1. A solar collector control system comprising:
 a. means for tracking the sun as it traverses in an arc across the sky;
 b. servo means for producing two sets of intermittent stepping signals representative of azimuth and elevation of said means for tracking;
 c. means for multiplexing said signals for transmission to remote locations;
 d. means for demultiplexing said signals at said remote locations; and
 e. stepping means for controlling the azimuth and elevation of solar collectors at said remote location in response to said signals.
2. The solar collector control system of claim 1 wherein said servo means comprises a servo signal generator.
3. The solar collector control system of claim 1 wherein said stepping means comprises stepping motors responsive to said signals produced by said servo means.
4. The solar collector control system of claim 2 wherein said stepping means comprises stepping motors responsive to said signals produced by said servo means.
5. The solar collector system of claim 1 wherein said means for tracking the sun comprises a solar tracking device.
6. The solar collector control system of claim 5 wherein said servo means comprises a servo signal generator.
7. The solar collector control system of claim 5 wherein said stepping means comprises stepping motors responsive to said signals produced by said servo means.

* * * * *